United States Patent [19]
Ariga

[11] Patent Number: 5,920,865
[45] Date of Patent: Jul. 6, 1999

[54] INFORMATION SERVER SYSTEM

[75] Inventor: Kenichi Ariga, Tokyo, Japan

[73] Assignee: NEC Corporation, Tokyo, Japan

[21] Appl. No.: 08/928,346

[22] Filed: Sep. 12, 1997

[30] Foreign Application Priority Data

Sep. 13, 1996 [JP] Japan .................................... 8-265220

[51] Int. Cl.⁶ .................................................. G06F 17/00
[52] U.S. Cl. ............................................. 707/10; 707/104
[58] Field of Search .................................. 348/8; 380/49;
370/522; 395/200.33, 200.34, 200.48; 707/10,
104

[56] References Cited

U.S. PATENT DOCUMENTS

| | | | |
|---|---|---|---|
| 5,253,341 | 10/1993 | Rozmanith et al. | 707/10 |
| 5,612,730 | 3/1997 | Lewis | 348/8 |
| 5,659,742 | 8/1997 | Beattie et al. | 707/104 |
| 5,673,322 | 9/1997 | Pepe et al. | 380/49 |
| 5,706,434 | 1/1998 | Kremen et al. | 395/200.48 |
| 5,729,549 | 3/1998 | Kostreski | 370/522 |
| 5,737,592 | 4/1998 | Nguyen et al. | 707/4 |
| 5,754,774 | 5/1998 | Bittinger et al. | 395/200.33 |
| 5,768,513 | 6/1998 | Kuthyar et al. | 395/200.34 |

FOREIGN PATENT DOCUMENTS

| | | |
|---|---|---|
| 63-40488 | 2/1988 | Japan . |
| 2-222356 | 9/1990 | Japan . |
| 6-62049 | 3/1994 | Japan . |
| 7-135512 | 5/1995 | Japan . |
| 7-302233 | 11/1995 | Japan . |
| 8-6875 | 1/1996 | Japan . |

OTHER PUBLICATIONS

Deri, L., "Surfin' Network Resources Across the Web", IEEE Comut. Soc. Press, pp. 158–167 Jun. 1996.
Chen et al., "A Scalable Video–on–Demand Service for the Provision of VCR–Like Functions", IEEE, 1995, pp. 65–72.
Tetzlaff et al., "Elements of Scalable Video Servers", IEEE, 1995, pp. 239–248.

*Primary Examiner*—Wayne Amsbury
*Assistant Examiner*—Thuy Pardo
*Attorney, Agent, or Firm*—Foley & Lardner

[57] ABSTRACT

An information server system is capable of optimization of multimedia data to be received from an information server depending upon transmission performance of a terminal for improving transmission efficiency and operability. The information server system is provided with an agent server as a gateway between a relatively low speed network, to which a terminal is connected, and a network connected to an information server, in which multimedia information forming one screen is divided into one or more image blocks and each block is transmitted therefrom with adding data amount and preference of thinning. The agent server is responsive to a demand for obtaining data from the terminal to the information server, determining thinning amount of data on the basis of the data amount and preference of thinning of respective blocks in the screen, added to the multimedia data from the information server depending upon transmission performance of the terminal.

4 Claims, 7 Drawing Sheets

INFORMATION SERVER SYSTEM

BACKGROUND OF THE INVENTION

1. Field of the Invention

The present invention relates generally to an information server system. More specifically, the invention relates to a data transmission system for a client accessing multimedia data accumulated in a world wide web (WWW) server on an internet or so forth.

2. Description of the Related Art

Conventionally, servers, such as for WWW are adapted for access through a high speed line, such as local area network (LAN) or so forth. For this reason, data amount per one screen of display means is significantly large.

Therefore, when access is made to such server through low speed line, such as radio mobile terminal, substantial time is required for reception. Thus, the user of the radio mobile terminal has to wait for substantial period.

Therefore, some currently existing WWW servers perform a process of thinning of data or so forth for showing data without irritating the user by nominally avoiding lowering of response period for the user using the low speed line. However, in the current status, speeding of information display for the user of low speed line is achieved merely by eliminating image data or by using a progressive display to display rough image at first and then progressively transmitting detail of the image.

As a multimedia communication system, in which, after negotiation of a center with a distant station depending upon a medium, such as a telephone receiver (TEL), a facsimile machine (FAX), a personal computer (PC), which the user uses, data transformation adapting to the medium is performed so that the transmission side can perform data transmission without paying attention for kind of the medium at the reception side, has been disclosed in Japanese Unexamined Patent Publication (Kokai) No. Heisei 2-22356, for example. The communication system proposed in the above-identified publication is illustrated in FIG. 7. Each of the terminals for communication has a system construction adapted for communication with distant station through a center 111.

When data transmission is performed from the PC terminal, for example, at first, call is made to the center 111 for authentication of the transmitting user, and then ID of the distant station is input. The center retrieves the medium held by the distant station based on the input ID to terminate the call at telephone receiver. Then, the center 111 sends a voice message requesting selection of a medium. In response to this, a receiver at the distant station selects the desired medium for reception and sends a response through a push button (PB).

The center 111 is responsive to the receiver's response to perform data transformation for the selected medium. Then, data is transmitted to the distant station.

On the other hand, in Japanese Unexamined Patent Publication No. Showa 63-40488, for example, there has been disclosed an image transmission system for a television conference system which can transfer a high density image at the same channel speed as that for transmitting image data for television conference.

Conventionally, when a terminal connected to a radio data communication network or an ordinary telephone circuit through a low speed modem attempts to browse information of the WWW server or so forth, it takes a quite long period for receiving data containing image and voice. In the viewpoint of the user of the terminal, slow response is irritating.

As a general solution, there are two ways, (1) data dedicated for low speed line is prepared for the server, and (2) data is thinned.

These methods encounter a common problem in that data cannot be processed depending upon transmission capacity of the line.

Furthermore, in the above-mentioned method of (1), two kinds of data have to be prepared for each page. Therefore, while this method is relatively easy to realize, large storage capacity becomes necessary for a hard disk in the server.

On the other hand, in case of the method of (2), function means performing thinning process becomes necessary in or out of the server. Only univocal thinning based on a given rule, such as "image data is not transmitted", can be done. Therefore, in certain cases, it is possible to transmit data different from intention of author who prepared the data.

SUMMARY OF THE INVENTION

Accordingly, the present invention has been worked out for solving the problems set forth above. It is therefore an object of the present invention to provide an information server system which can restrict increasing of storage capacity of the server device, restrict lowering of response performance of the terminal by improving transmission efficiency, and particularly improve operability by performing thinning along intention of author who prepared the data.

Another object of the invention is an information server system which enables transmission of an optimal data to a terminal by making a thinning rate of data variable depending upon transmission performance of the line.

An information server system, according to the present invention, achieves an object by providing an agent server which thins data from an information server adapting to a terminal connected through a relatively low speed communication line. The present invention determines data for thinning on the basis of information of preference of thinning added to a header portion of the data from the information server and preliminarily obtained information of transmission performance of terminal.

According to one aspect of the present invention, an information server system provided with an agent server as a gateway between a relatively low speed network, to which a terminal is connected, and a network connected to an information server, in which multimedia information forming one screen is divided into one or more image blocks and each block is transmitted therefrom with adding data amount and preference of thinning, wherein the improvement comprises the agent server being responsive to a demand for obtaining data from the terminal to the information server, determining thinning amount of data on the basis of the data amount and preference of thinning of respective blocks in the screen, added to the multimedia data from the information server depending upon transmission performance of the terminal.

According to another aspect of the present invention, an information server system handling a multimedia data, comprises:

a terminal connected to a network having low transmission speed;

an information server accumulating multimedia data with establishing at least one block for each screen and with adding data amount and preference of thinning to a header portion of each block data;

an agent server having means for performing thinning process of multimedia data received from the information server by proxy in response to a demand from the terminal, and means for transmitting thinned data to the terminal;

the terminal including means for setting an allowable period for reception per one screen and means for notifying the allowable reception period to the agent server; and the agent server including means for receiving information of allowable period per one screen and transmission speed noticed from the terminal;

means for obtaining data from the information server in response to demand for information from the terminal, by proxy;

means for receiving multimedia data in a form of at least one blocks from the information server and obtaining data amount of each block data from a header information of the data; and means for reconstructing the selected block data into packet data for transmission to the terminal.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessary obscuring of the present invention.

Figure 1:
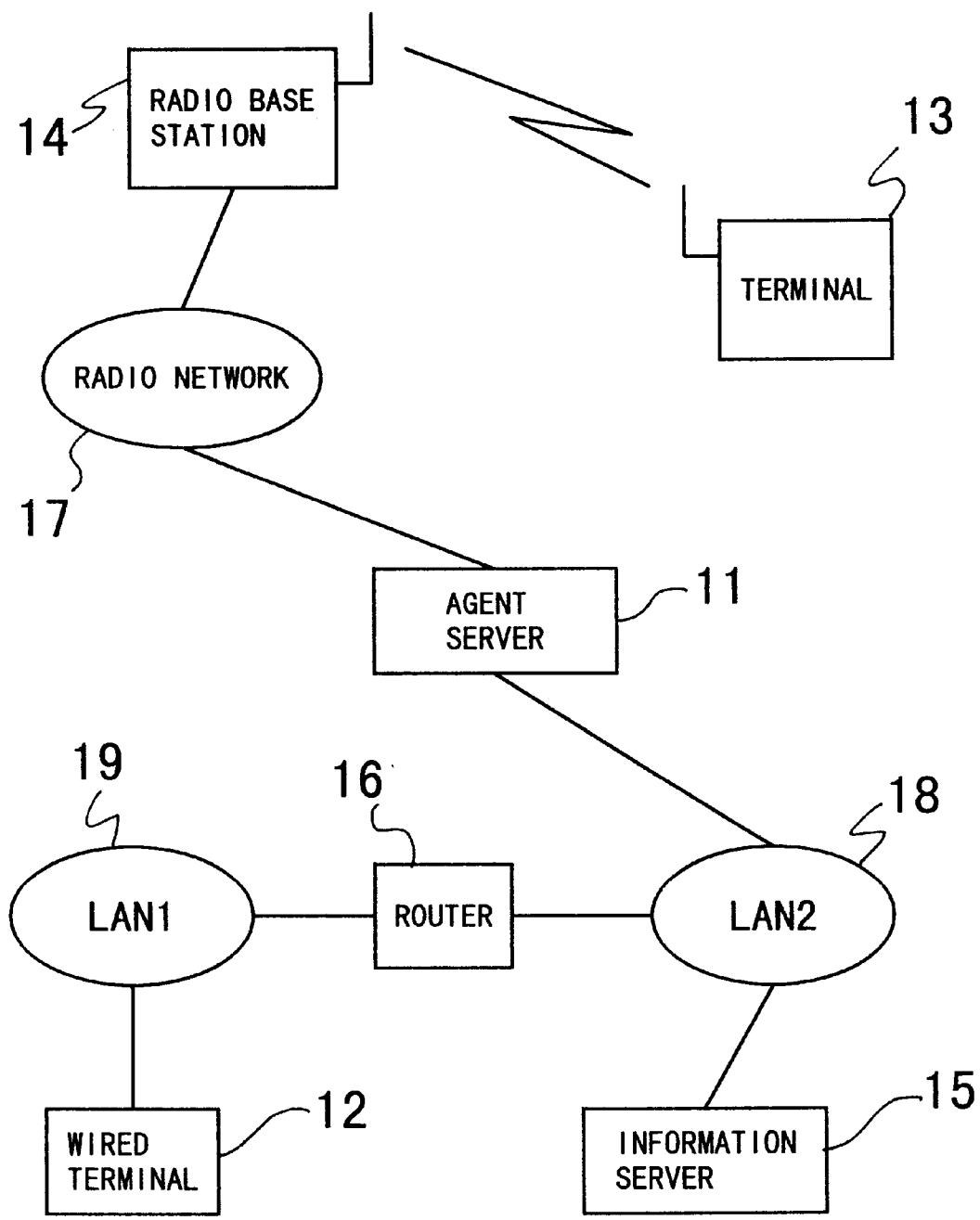
FIG. 1 is an illustration showing one example of the system construction of an information server system implementing the present invention.

FIG. 1 is an illustration showing a system construction of the first embodiment of an information server system according to the present invention. Referring to FIG. 1, in the first embodiment of the present invention, a radio mobile terminal 13 is connected to a radio base station 14. The radio base station 14 is, in turn, connected to an agent server 11 through a radio network 17.

The agent server 11 is connected to a second local area network (LAN2), to which an information server 15 is connected.

Here, when a wired terminal 12 connected to a first local area network (LAN1) 19 via a wired communication line, such as Integrated Service Digital Network (ISDN), is to obtain information of the information server 15, communication is performed through a router 16.

When the radio mobile terminal 15 is to obtain the information of the information server, communication is performed with the agent server 11 via the radio base station 14.

The agent server 11 obtains data from the information server by proxy in response to a demand for obtaining data from the radio mobile terminal 13. The agent server 11 transmits the obtained data to the radio mobile terminal 13 after transformation of data.

The internal process of the agent server will be discussed hereinafter in greater detail.

Figure 2:
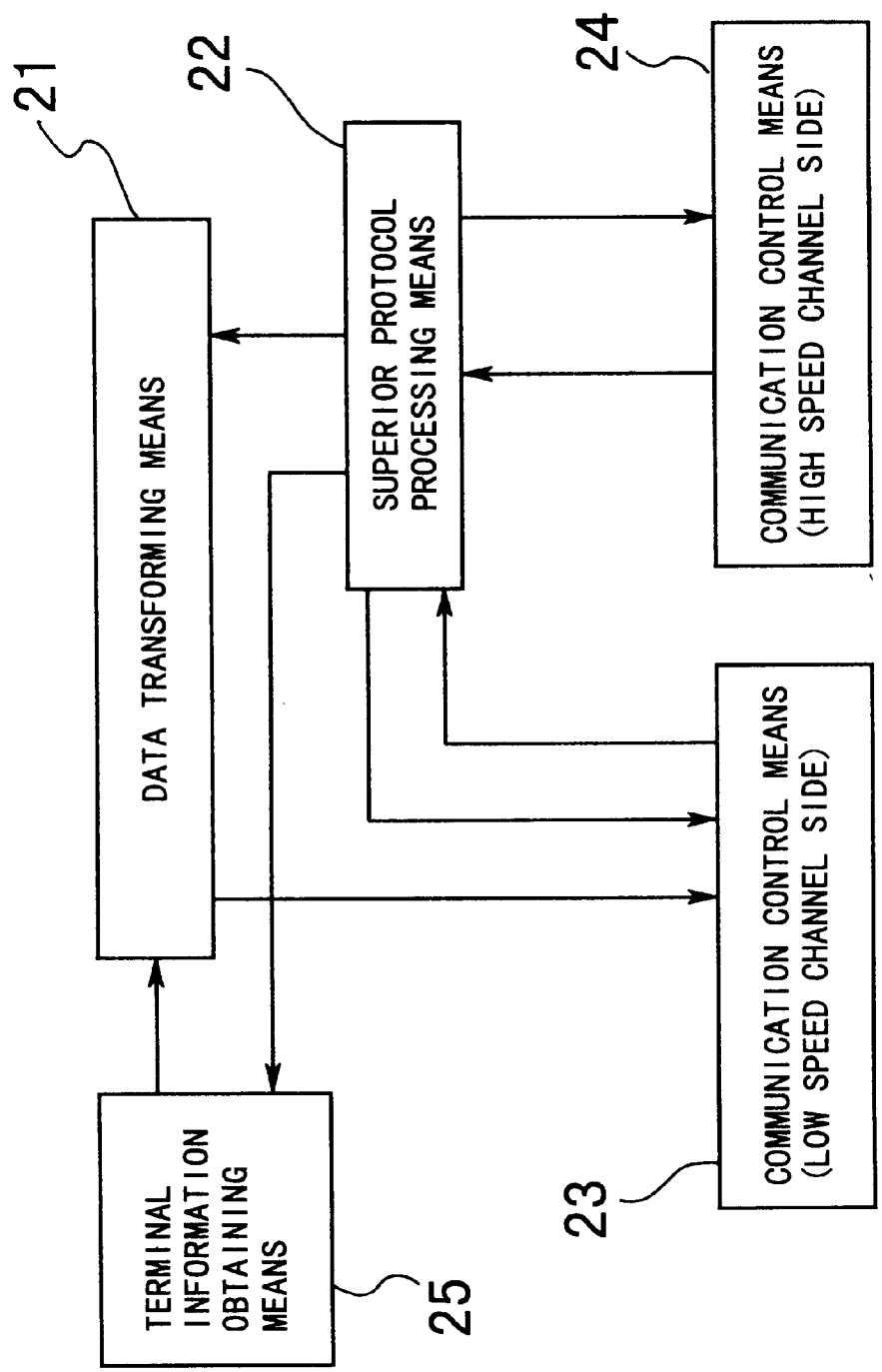
FIG. 2 is a block diagram showing an agent server function in implementation of the present invention.

FIG. 2 is a block diagram for explaining the internal process of the agent server in the embodiment shown in FIG. 1. As shown in FIG. 2, the agent server 11 is divided into five function blocks.

Referring to FIG. 2, the agent server 11 includes means for controlling communication protocol, such as transmission control protocol/Internet protocol (TCP/IP) and so forth, a communication control means 23 for low speed line, such as analog telephone network, radio telephone network, and a communication control means 24 for high speed line, such as digital telephone network, such as ISDN, local area network (LAN), as communication control means. It should be noted that when the radio network 17 and the agent server 11 have the same interface as the second LAN 18 or the first LAN 19, the communication control means can be one.

A superior protocol processing means 22 performs protocol processing for hyper text transfer protocol (HTTP) performing exchange of information of WWW or so forth.

A data transforming means 21 transforms multimedia information data received from information server 25 connected to the high speed line (LAN) into that for low speed line.

Terminal information obtaining means 25 processes terminal information, such as transmission performance transmitted from the terminal after connection of the terminal to the agent server 11.

Here, discussion will be given for operation in the agent server 11 when the radio mobile terminal 13 shown in FIG. 1 sends request for information data to the information server 15.

When the radio mobile terminal 13 demands connection to the agent server 11, procedure of connection is processed by the communication control means 23 and the superior protocol processing means 22. Then, after completion of connection, a terminal information notice packet transmitted from the radio mobile terminal 13 is processed by the terminal information obtaining means 25.

On the other hand, connection procedure from the agent server 11 to the information server 15 is processed by the communication control means 24 and the superior protocol processing means 22. Once connection is completed and the agent server 11 receives the information data from the information server 15, the information data is transferred to the data transforming means 21 via the communication control means 24 and the superior protocol processing means 22.

The data transforming means 21 generates a thinned data from the transmission speed information from the terminal information and a header information provided at the leading end of the information data.

Generation of the thinned data is performed based on a maximum data transfer amount by defining a product (T×r [bit]) of an allowable period (allowable maximum transmission period for one screen: T[s]) which the user may permit for reception of data for one screen, and a transmission speed: r[bps] of the radio mobile terminal, as the maximum data transfer amount.

More practically, generation is performed by summing amount of respective data stored in the header of the received data in the descending order of thinning preference until the sum becomes the closet to the maximum data transfer amount.

Next, discussion will be given for hardware construction of the agent server 11 in the embodiment of the present invention with reference to block diagram of FIG. 3.

Figure 3:
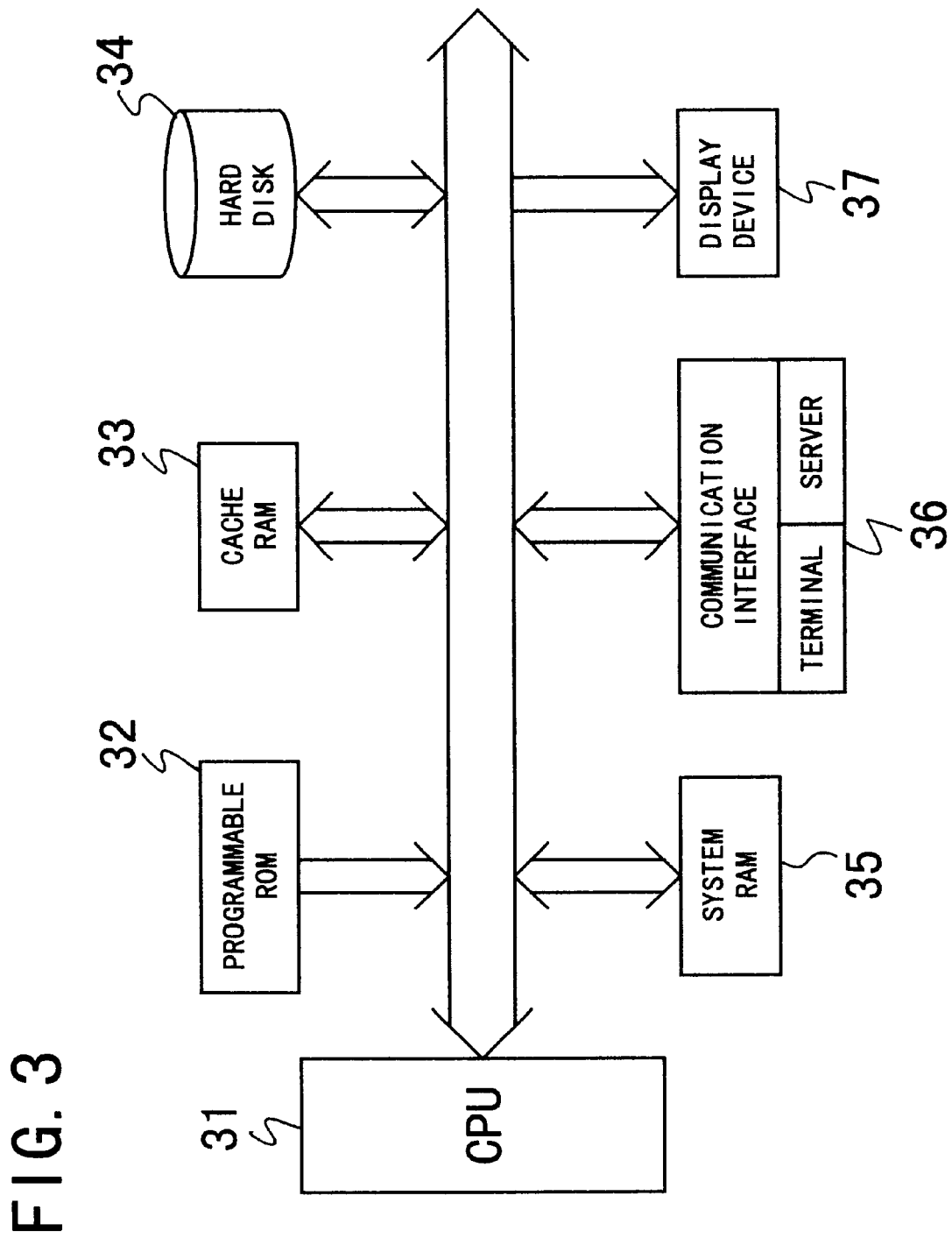
FIG. 3 is an illustration showing one example of a hard ware construction of the preferred embodiment of the agent server according to the invention.

Referring to FIG. 3, CPU 31 controls overall system. In a programmable read-only-memory (ROM) 32, there are stored programs for controlling input/output (I/O), boot action of operating system (OS).

A system random access memory (RAM) 35 is a memory region which are used by OS or I/O. A cache RAM 33 is a memory for accumulating received data for caching.

A communication interface 36 has a first portion which controls communication with the server and a second portion which controls communication with the terminal and has interfaces at terminal side and server side, respectively. A hard disk 34 stores OS and information data.

Next, operation of the shown embodiment of the information server system according to the present invention will be discussed.

Figure 4:
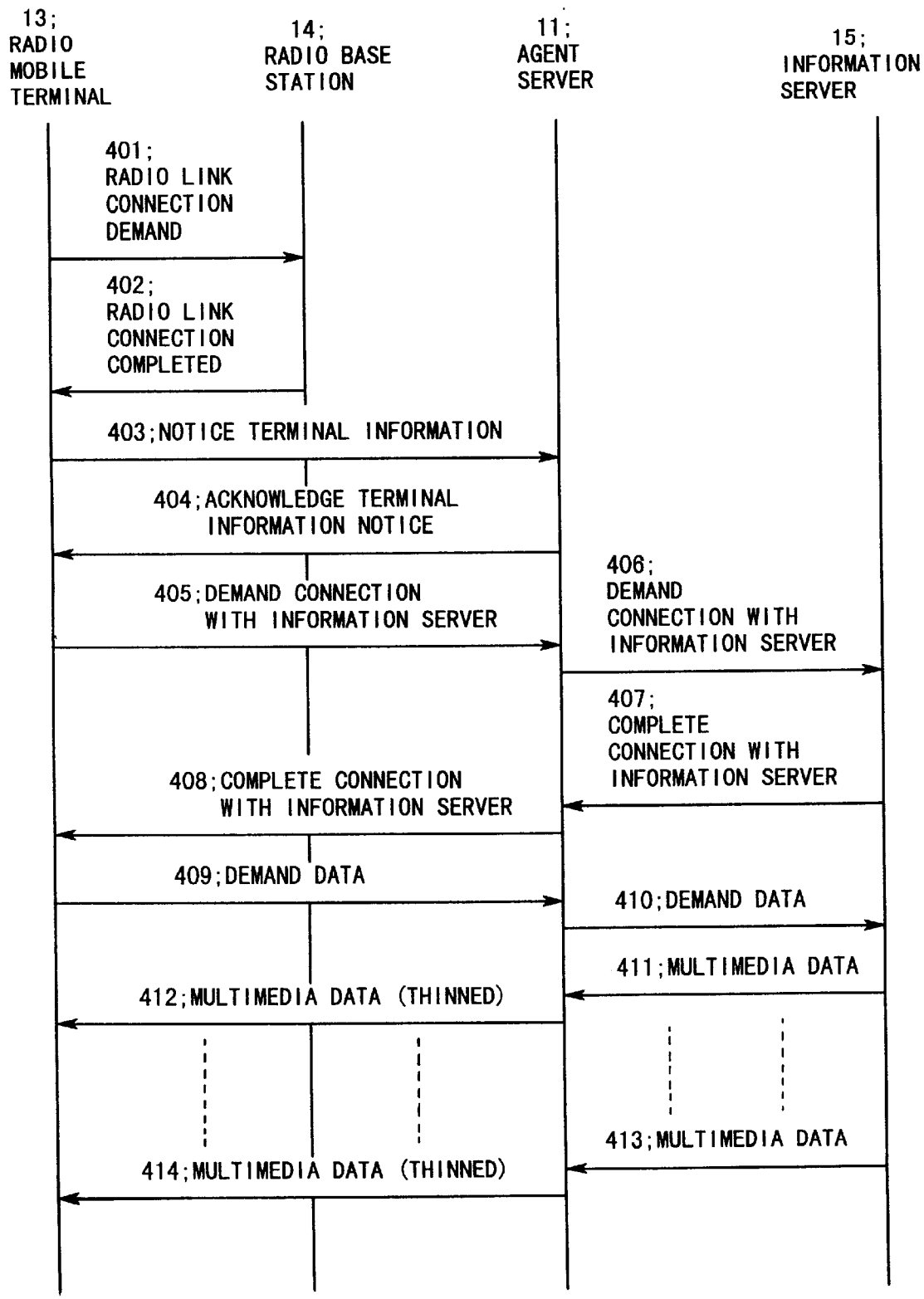
FIG. 4 is a chart showing the sequence of operation in one embodiment of the present invention.

Referring to a chart of sequence of FIG. 4, at first, the radio mobile terminal 13 establishes connection of radio link between the radio base station 14 (401). When radio link connection is completed (402), the terminal information is noticed to the agent server 11 (403). As a content of notice, a transmission speed of the terminal, kind of terminal and allowable maximum period for one screen are included. The word "allowable maximum period for one screen" shows a allowable waiting period for the user for receiving the multimedia data. The allowable maximum period for one screen is preliminarily set by the user of the radio mobile terminal 13.

Upon reception of an terminal information notice acknowledgement message from the agent server 11 (404), the radio mobile terminal 13 transmits a connection demand message for the information server to the agent server 11 (405).

The agent server 11 is responsive to the connection demand message from the radio mobile terminal 12 to demand connection to the information server 15 (406). Once connection is established (407), the agent server 11 transmits a connection completion message by proxy (408). Thereafter, multimedia data can be obtained at the radio mobile terminal 13 from the information server.

When the radio mobile terminal 13 transmits a data demand for the information server 15 to the agent server 11 (409), the agent server 11 makes data demand to the information server 15 by proxy (410).

When the agent server 11 obtains the demanded multimedia data from the information server 15, the agent server 11 performs thinning process for the data, and thereafter transmits the thinned multimedia data to the radio mobile terminal 13. By repeating these processes, the radio mobile terminal 13 may received optimal data.

Next, discussion will be given for thinning process in the agent server 11.

In general, the multimedia data registered in WWW (world Wide Web) server contains only characters or character and video image in one screen.

Figure 6:
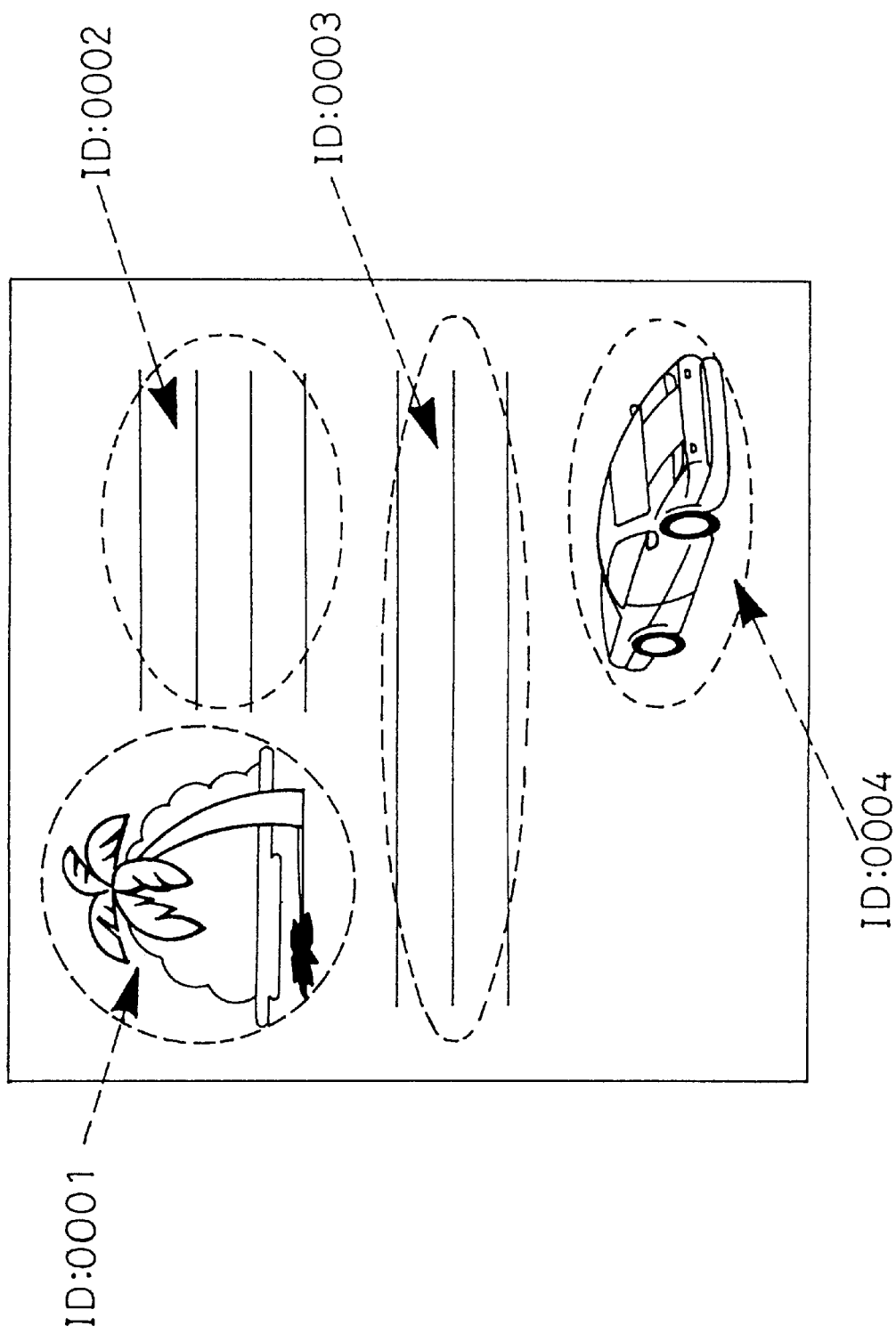
FIG. 6 is an illustration for explaining the preferred embodiment of the invention, illustrating one example of the multimedia data to be displayed on the screen.
Figure 7:
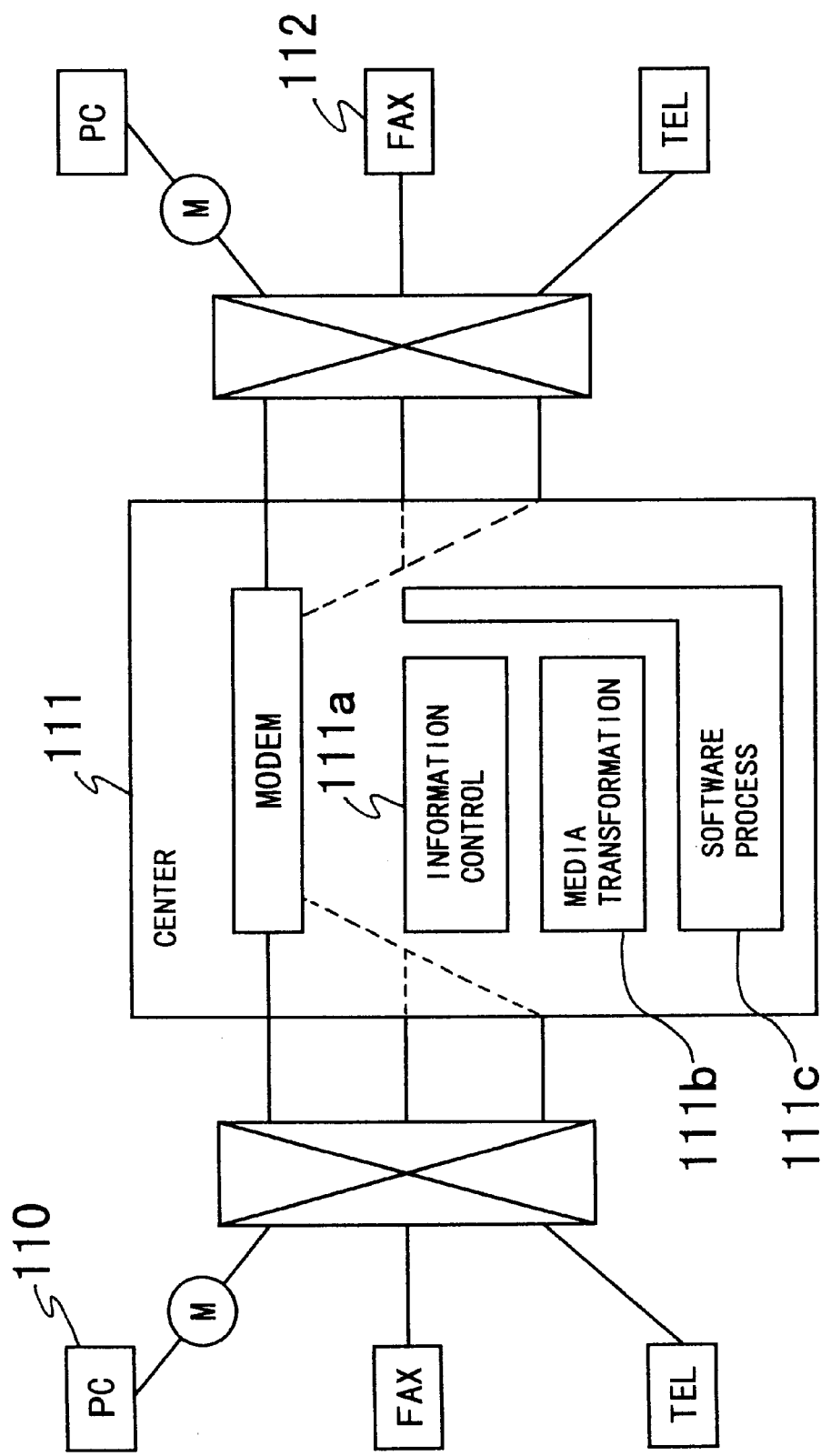
FIG. 7 is an illustration for explaining one example of the construction in the prior art.

In the shown embodiment, identification codes (ID numbers) are assigned for respective blocks of the data for one screen. In the example shown in FIG. 6, ID numbers 0001 and 0004 are assigned for image data and ID numbers 0002 and 0003 are assigned for character data. Then, together with respective data amount of respective blocks, the ID number is added to the leading ends of respective data as header. Furthermore, in the header, preferential order for thinning of respective block data is added.

Figure 5:
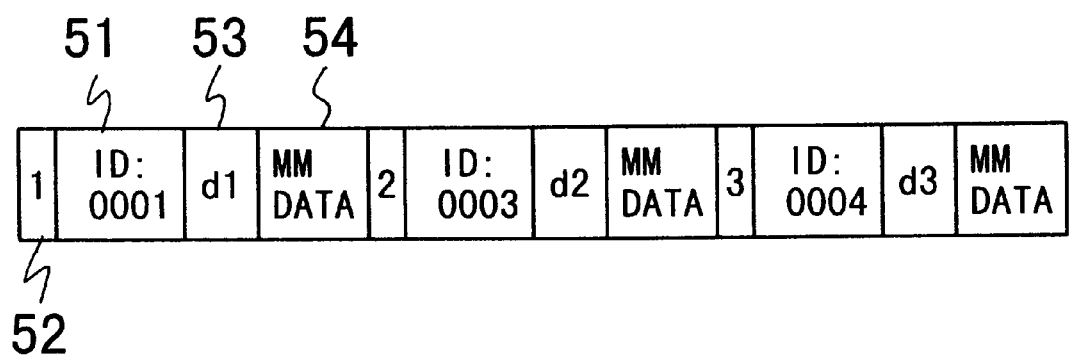
FIG. 5 is an illustration for explaining the preferred embodiment of the invention, illustrating a data format of a multimedia data.

FIG. 5 is an illustration showing one example of a data format to be transmitted from the information server 15 to the agent server, in the shown embodiment. Referring to FIG. 5, the reference numeral 52 denotes a preferential order for thinning, 51 denotes an ID number of block data, 53 denotes a data amount of the block, 54 denotes a multimedia (MM) data. These construction is provided for each block unit of the image data.

Next, discussion will be given for manner for determining data for thinning in the shown embodiment.

Here, it is assumed that allowable maximum transmission period for one screen is T[s] and the transmission speed of the terminal is r[bit/s]. When data is thinned as shown in FIG. 5, n is retrieved so that $$Sdn = d1 + d2 + \ldots + dn \tag{1}$$

becomes close to (T×r) as close as possible.

It should be noted that, in the foregoing equation (1), suffix "n" represents preference. For example, d1 represents data amount of the data block having the preference: 1.

For example, when $$(d1 + d2 + d3) > (T \times r) \tag{2}$$

is established, the image data assigned ID number 0001 and character data assigned ID number 0003 respectively having preference of 1 and 2 for thinning are used as data to be thinned.

Here, when $$d1 > (T \times r) \tag{3}$$

is established, only data assigned ID number 0001 is transmitted to the radio mobile terminal 13. In this case, the maximum allowable transmission period for one screen should be exceeded.

As set forth above, the present invention achieves the following effect. (1) The first effect of the present invention is to enable reception of multimedia data adapted to transmission performance of the radio mobile terminal per se.

The reason is that, in the present invention, the agent server may generate optimal data for the radio mobile terminal on the basis of information, such as data amount of respective blocks of the screen added to the multimedia data accumulated in the information server and transmission speed of the terminal obtained from the terminal. (2) The second effect of the present invention is to enable thinning with giving importance of the author of data upon thinning multimedia data accumulated in the information server.

The reason is that, in the present invention, the block data ID and the preference are added per respective blocks of the multimedia data accumulated in the information server, and thinning of data is performed by the agent server on the basis of such information.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. An information server system comprising:

an agent server as a gateway between a relatively low speed network, to which a terminal is connected, and another network; and an information server, connected to said another network, in which multimedia information forming one screen is divided into one or more image blocks and each block is transmitted therefrom with a data amount and a preference of thinning added to said each block depending upon transmission performance of said terminal, wherein said agent server is responsive to a demand for obtaining data from said terminal to said information server, determines a thinning amount of data on the basis of said data amount and said preference of thinning of respective blocks in the screen, and transmits said one or more image blocks to said terminal while thinning the data contained in said one or more blocks to a magnitude corresponding to the determined thinning amount.

2. An information server system provided with an agent server as a gateway between a relatively low speed network, to which a terminal is connected, and a network connected to an information server, in which multimedia information forming one screen is divided into one or more image blocks and each block is transmitted therefrom with adding data amount and preference of thinning, wherein the improvement comprising:

said agent server being responsive to a demand for obtaining data from said terminal to said information server, determining thinning amount of data on the basis of said data amount and preference of thinning of respective blocks in the screen, added to said multimedia data from said information server depending upon transmission performance of said terminal, and wherein said agent server determines thinning amount of data based on said data amount and preference of thinning of respective blocks so that the thinned data amount becomes a value close to a data amount determined on the basis of an allowable maximum transmission period of one screen of said terminal and said transmission speed of said terminal as close as possible.

3. An information server system handling a multimedia data, comprising:

a terminal connected to a network having low transmission speed;

an information server accumulating multimedia data with establishing at least one block for each screen and with adding data amount and preference of thinning to a header portion of each block data;

an agent server having means for performing thinning process of multimedia data received from said information server by proxy in response to a demand from said terminal, and means for transmitting thinned data to said terminal;

said terminal including means for setting an allowable period for reception per one screen and means for notifying said allowable reception period to said agent server; and said agent server including means for receiving information of allowable period per one screen and transmission speed noticed from said terminal;

means for obtaining data from said information server in response to demand for information from said terminal, by proxy;

means for receiving multimedia data in a form of at least one block from said information server and obtaining data amount of each block data from a header information of said data; and means for reconstructing the selected block data into packet data for transmission to said terminal.

4. An information server system as set forth in claim 3, wherein said agent server selects block data depending upon preferential order stored in header information of respective block data.

* * * * *